US007513967B2

(12) United States Patent
Kato et al.

(10) Patent No.: US 7,513,967 B2
(45) Date of Patent: Apr. 7, 2009

(54) MOLDED FIBER MATERIALS AND METHODS AND APPARATUS FOR MAKING THE SAME

(75) Inventors: Takehiro Kato, Aichi (JP); Kumiko Sango, Aichi (JP); Masato Nomura, Gifu (JP); Kazuo Hayakawa, Gifu (JP)

(73) Assignees: Toyota Boshoku Kabushiki Kaisha, Aichi (JP); Kabushiki Kaisha Otsuka, Gifu (JP)

( * ) Notice: Subject to any disclaimer, the term of this patent is extended or adjusted under 35 U.S.C. 154(b) by 513 days.

(21) Appl. No.: 10/381,826

(22) PCT Filed: Sep. 27, 2001

(86) PCT No.: PCT/JP01/08450

§ 371 (c)(1),
(2), (4) Date: Aug. 8, 2003

(87) PCT Pub. No.: WO02/27091

PCT Pub. Date: Apr. 4, 2002

(65) Prior Publication Data

US 2004/0026012 A1 Feb. 12, 2004

(30) Foreign Application Priority Data

Sep. 27, 2000 (JP) ............................ 2000-294925

(51) Int. Cl.
*B29C 65/00* (2006.01)
*B28B 17/00* (2006.01)

(52) U.S. Cl. ........................................ 156/80; 425/145

(58) Field of Classification Search .................. 264/76, 264/78, 115, 118, 245, 140; 428/297.4, 300.7, 428/301.4, 200, 298, 301, 302, 292.1; 425/145; 156/80
See application file for complete search history.

(56) References Cited

U.S. PATENT DOCUMENTS

| | | | | |
|---|---|---|---|---|
| 3,740,797 | A | 6/1973 | Farrington | |
| 3,768,118 | A | 10/1973 | Ruffo et al. | |
| 4,676,871 | A | 6/1987 | Cadieux et al. | |
| 4,822,668 | A | 4/1989 | Tanaka et al. | |
| 4,923,658 | A * | 5/1990 | Hover et al. | 264/76 |
| 5,194,462 | A | 3/1993 | Hirasaka et al. | |

(Continued)

FOREIGN PATENT DOCUMENTS

AT 398 585 B 12/1994

(Continued)

*Primary Examiner*—D. Lawrence Tarazano
*Assistant Examiner*—Camie S Thompson
(74) *Attorney, Agent, or Firm*—Patterson, Thuente, Skaar & Christensen, P.A.

(57) ABSTRACT

A raw material including a mixture of a natural fiber and a thermoplastic fiber is supplied to a surface of a rotating rotary body. The natural and thermoplastic fibers are scattered toward a carrying surface of a conveyor belt by the rotational force of the rotary body. An air blower may direct pressurized air to the scattered raw material in order to further effect separation of the natural and thermoplastic fibers. Consequently, the natural fibers and the thermoplastic fibers are deposited such that the relative concentration of the natural fibers and the thermoplastic fibers gradually and seamlessly changes or varies across the thickness of depth of the resulting molded fiber material.

7 Claims, 6 Drawing Sheets

U.S. PATENT DOCUMENTS

| | | | | |
|---|---|---|---|---|
| 5,430,911 | A | 7/1995 | Nakamura et al. | |
| 5,537,718 | A | 7/1996 | Nagatsuka et al. | |
| 5,778,494 | A | 7/1998 | Freund et al. | |
| 5,783,505 | A | 7/1998 | Duckett et al. | |
| 5,974,631 | A | 11/1999 | Leifeld | |
| 6,316,088 | B1 * | 11/2001 | Ogawa et al. | 428/297.4 |
| 6,495,225 | B1 * | 12/2002 | Nakajima et al. | 428/35.7 |
| 6,861,131 | B2 * | 3/2005 | Evans | 428/304.4 |

FOREIGN PATENT DOCUMENTS

| | | | |
|---|---|---|---|
| CA | 2422241 | | 9/2001 |
| CN | 018163831 | | 3/2006 |
| EP | 0 093 585 | | 11/1983 |
| EP | 0 521 444 | A1 | 1/1993 |
| EP | WO 96/05347 | * | 2/1996 |
| JP | 2000-141524 | A | 5/2000 |

* cited by examiner

MOLDED FIBER MATERIALS AND METHODS AND APPARATUS FOR MAKING THE SAME

BACKGROUND OF THE INVENTION

1. Field of the Invention

The present invention relates to molded fiber materials that may be utilized, e.g., as a trim material, such as door trim for automobiles, a construction material, such as wall material for houses, and furniture. The present invention further relates to methods and apparatus for manufacturing such molded fiber materials.

2. Description of the Related Art

Known fiber laminates (graded mats) provide variations in concentration of a natural fiber and a thermoplastic fiber across the thickness or depth of the fiber laminate by adhering a plurality of discrete layers. As shown in FIG. 9, a known fiber laminate 100 has been manufactured by adhering a plurality of layers 101-103 that were separately and individually manufactured in advance. Each layer 101-103 has a substantially uniform concentration or mixture of the natural and thermoplastic fibers, although the concentration or mixture of the natural and thermoplastic fibers of each respective layer 101-103 differs. For example, the front and rear sides of the fiber laminate 1000 may be formed of a relatively thermoplastic fiber-rich layer 101 (i.e., layer 101 contains more thermoplastic fiber than natural fiber). Further, the interior layers 102-103 may have higher concentrations of natural fiber than thermoplastic fiber. Such fiber laminates have been used as trim materials, such as door trim materials for automobiles.

However, the known fiber laminate 100 is disadvantageous, because it is necessary to separately manufacture each of the layers 101-103 and each respective layer 101-103 requires a different concentration and a separate manufacturing process. Thereafter, the respective layers 101-103 must be adhered together in another manufacturing step. Therefore, known fiber laminate manufacturing processes require many steps, thereby complicating the production process and reducing productivity.

SUMMARY OF THE INVENTION

It is, accordingly, one object of the present invention to teach improved techniques for manufacturing molded fibrous materials. For example, in one aspect of the present teachings, techniques are taught for mixing a natural fiber and a thermoplastic fiber during a process for manufacturing a molded fibrous material, so that the concentration of natural fiber and thermoplastic fiber seamlessly varies across the thickness or depth of the molded fibrous material.

Thus, in one embodiment of the present teachings, molded fibrous materials are formed such that the concentration of a natural fiber, e.g., kenaf fiber, and a thermoplastic fiber, e.g., polypropylene (PP) fiber, changes gradually across the thickness of the molded fibrous material. For example, the ratio of the thermoplastic fiber to the natural fiber may gradually and seamlessly increase from a first surface to a second surface, such the first surface has a relatively high concentration of natural fiber and the second surface has a relatively high concentration of thermoplastic resin. Thus, the present teachings enable the production of a single, seamless molded fibrous material having a first surface with a high natural fiber content (and low thermoplastic fiber content) and second surface that has a high thermoplastic fiber content (and low natural fiber content). Preferably, the concentration of the respective fibers changes substantially continuously and gradually from the first surface to the second surface without any seams.

Such molded fibrous materials are advantageous because no interfaces are formed between individual layers that have been adhered or laminated together. Instead, substantially one seamless product is formed, thereby increasing the strength of the product as compared to known fiber laminates. Further, peeling of the laminated layers of the known fiber laminates is eliminated, thereby increasing the durability of the present molded fibrous materials as compared to known fiber laminates.

In another embodiment of the present teachings, the first and second surfaces may have a relatively high concentration of thermoplastic material and the interior of the molded fibrous material may have a relatively high concentration of natural fiber. Thus, the concentration of the thermoplastic fiber continuously and seamlessly generally decreases from the first surface to the interior, wherein the natural fiber concentration correspondingly increases. Then, the concentration of the thermoplastic fiber continuously and seamlessly becomes greater from the interior to the second surface, wherein the natural fiber concentration correspondingly decreases. Thus, the present teachings enable the production of a molded fibrous material having an interior with a high natural fiber content (and low thermoplastic fiber content) and outer surfaces that have a high thermoplastic fiber content (and low natural fiber content).

In another aspect of the present teachings, methods are taught for preparing such molded fibrous materials. For example, two types of fibrous raw materials may be used and each type may have a different density. The two types of fibrous raw materials may be mixed and scattered over a conveyor belt. The molded fibrous material may be formed by exploiting the difference in densities between the two fibrous substances. Of course, another property of the two types of materials may be exploited to make molded fibrous materials of the present teachings. Naturally, such method enables the molded fibrous product to be manufactured substantially in one step and the need to laminate a plurality of layers is eliminated.

In a preferred manufacturing method according to the present teachings, a raw material is formed by mixing natural fibers and thermoplastic fibers. Then, the mixture is supplied to the surface of a rotating rotary body and the mixture is scattered toward a carrying surface due to the rotation force of the rotary body. Consequently, the natural fibers and the thermoplastic fibers will partially separate and will be deposited so that the concentration of the natural fiber and the thermoplastic fiber changes across the thickness or depth of the molded fibrous material. Thus, a molded fibrous material having varying concentrations of the natural fibers and the thermoplastic fibers can be made in a single step, thereby increasing production efficiency over known techniques.

Optionally, the molded fiber material can then be heated and pressed in order to form a board.

In another embodiment of the present teachings, the natural fibers and the thermoplastic fibers may be intertwined using a needle punching process. Herein, the term "intertwine" is intended to mean uniting or intermingling the natural and thermoplastic fibers by twining, twisting or interlacing the two respective fibers. As a result, the natural fibers and the thermoplastic fibers are intertwined across the thickness of the molded fibrous material, thereby preventing peeling of the two types of fibers.

In another embodiment of the present teachings, two molded fibrous materials, which may be prepared according to the techniques discussed above, may be laminated or adhered together. As a result, a molded fiber laminate can be formed that has, for example, a front and rear surface that have a relatively high concentration of the same type of fibers and the interior has a relatively high concentration of a different type of fibers. Of course, the concentration of the two types of fibers may gradually and substantially seamlessly change or vary from the interior towards the respective outer surfaces.

In another aspect of the present teachings, apparatus are taught for making molded fibrous materials and for practicing the method steps described above and below. For example, a representative apparatus may include a rotary body and means for feeding a raw material to the rotary body. The raw material preferably comprises a mixture of natural fibers and thermoplastic fibers, although naturally other raw materials may be advantageously utilized with the present teachings. For example, any raw material comprising fibers, or other compositions, having at least two different densities may be utilized to form molded materials having concentrations that continuously and seamlessly change or vary across the thickness or depth of the molded material. Preferably, the raw material is supplied to the surface of the rotary body and compressed or pressurized air is blown across the raw material. Therefore, the raw material will scatter and will be deposited across the surface of the rotary body. Further, means may be provided for receiving and transporting the scattered raw material.

Thus, in another preferred embodiment, the raw material containing the mixture of natural and thermoplastic fibers is disposed onto the surface of the rotating rotary body and compressed or pressurized air is blown onto and/or through the raw material, thereby scattering the raw material towards the transportation means. If the natural fiber is denser than the thermoplastic fiber, the natural fiber will not be substantially affected by the compressed air and will be more affected by the centrifugal force generated by the rotating rotary body. Therefore, the natural fiber will project substantially tangentially from the rotating rotary body.

On the other hand, the thermoplastic fiber will be more affected by the compressed air, than the centrifugal force of the rotating rotary body, because it is less dense. Therefore, the thermoplastic fibers will partially separate from the natural fibers and will fall more directly towards the transportation means. As a result, a top surface of the resulting molded fibrous material will have a relatively higher concentration of the denser natural fibers and a-bottom surface of the resulting molded fibrous material will have a relatively higher concentration of the less dense thermoplastic fibers. By appropriately adjusting the centrifugal force of the rotating rotary body and the pressure of the air stream applied to the raw material, the natural fibers and the thermoplastic fibers are deposited onto the transportation means such that the concentration of the two fibers gradually changes across the thickness of the molded fibrous material.

In another embodiment of the present teachings, the apparatus may further include means for needle punching the molded fibrous material being conveyed by the transportation means. Needle punching the molded fibrous material can intertwine the natural and thermoplastic fibers and can reliably reduce peeling of the molded fiber material.

Additional objects, features and advantages of the present invention will be readily understood after reading the following detailed description together with the accompanying drawings and the claims.

DETAILED DESCRIPTION OF THE INVENTION

Figure 1:
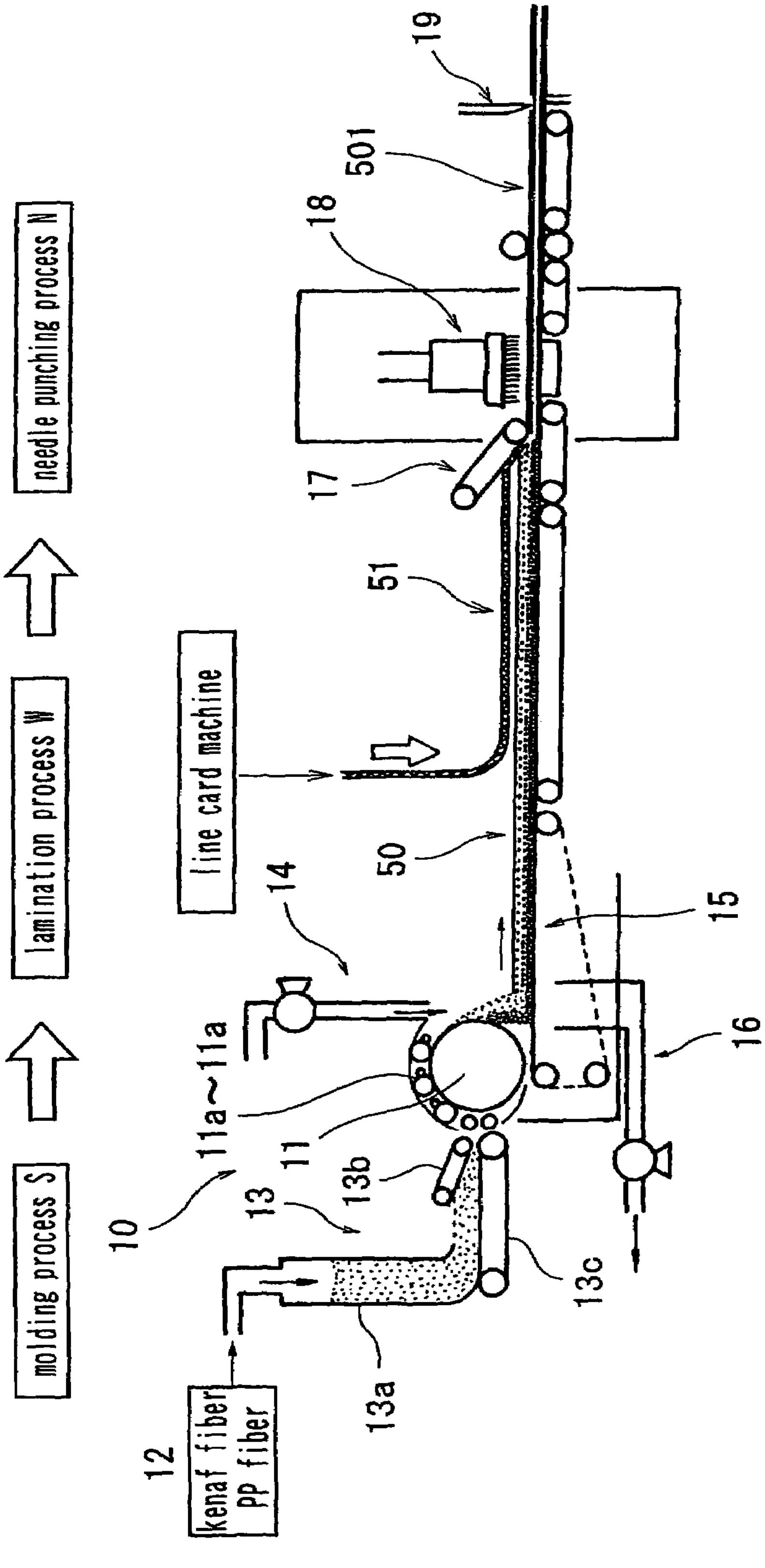
FIG. 1 shows a representative manufacturing apparatus 10 of the present teachings.

Molded fiber materials are taught that preferably comprise a mixture of natural fibers and thermoplastic fibers. Preferably, the relative concentration of the natural fibers may gradually and seamlessly change with respect to the concentration of the thermoplastic fibers across the thickness or depth of the molded fiber material. In one embodiment, the concentration of thermoplastic fibers may be greater than the natural fibers on a first surface of the molded fiber material and the concentration of natural fibers may be greater than the thermoplastic fibers on a second surface of the molded fiber material. In another embodiment, the concentration of thermoplastic fibers may be greater than the natural fibers on respective exterior or outer surfaces of the molded fiber material and the concentration of natural fibers may be greater than the thermoplastic fibers within an interior of the molded fiber material.

Methods for manufacturing molded fiber materials may include supplying a raw fiber material to the surface of a rotary body. Preferably, the raw fiber material comprises a mixture of thermoplastic fibers and natural fibers and the thermoplastic fibers preferably have a lessor or lower density than the natural fibers. Thereafter, the rotary body may be rotated to thereby scatter the natural fiber and the thermoplastic fiber supplied to the rotary body toward a carrying surface, which may be for example a conveyor belt. The scattering may be caused due to the rotational force of the rotary body and the difference in densities between the thermoplastic fibers and the natural fibers. Optionally, a pressurized air stream may be directed towards the scattered raw materials in order to effect further scattering or separation of the natural and thermoplastic fibers. The natural fibers and thermoplastic fibers are preferably disposed or deposited on the carrying surface or conveyor belt, such that the concentration of natural fibers and thermoplastic fibers gradually and seamlessly changes across the thickness of the molded fiber material.

Further methods include laminating a thermoplastic fiber onto the molded fiber material. In addition or the alternative, the natural fiber may be intertwined with the thermoplastic fibers. In another embodiment, two molded fiber materials may be laminated or adhered together to form a molded fiber laminate.

Apparatus for manufacturing a molded fiber material may include a rotary body and means for supplying a raw material to the surface of the rotary body. Preferably, the raw material comprises at least two fibers having different densities. Means for blowing pressurized air onto the raw material disposed on the surface of the rotary body are provided in order to scattering the raw material. Further, means may be provided to receive and transport the scattered raw material. Optionally, means may be provided for needle punching the scattered raw material disposed on the transportation means.

In each of the above materials, methods and apparatus, the thermoplastic fiber preferably comprises polypropylene fibers and the natural fiber preferably comprises kenaf fibers.

Each of the additional features and method steps disclosed above and below may be utilized separately or in conjunction with other features and method steps to provide improved molded fibrous material and methods and apparatus for making and using such molded fibrous materials. Representative examples of the present invention, which examples utilize many of these additional features and method steps in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention. Moreover, various features of the representative examples and dependent claims may be combined in ways that are not specifically enumerated in order to provide additional useful embodiments of the present teachings.

Figure 7:
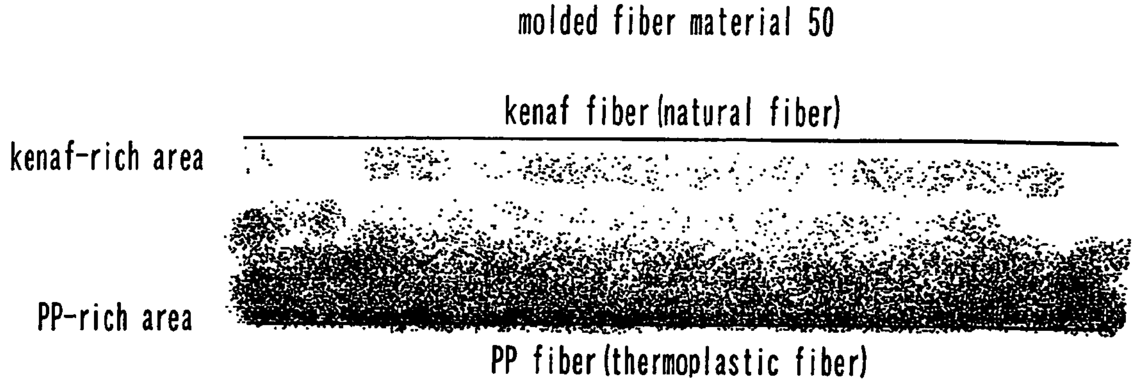
FIG. 7 shows a representative molded fiber material 50 that can be produced using molding process S.

Referring first to FIG. 7, a representative molded fiber material 50 is shown that can be manufactured according to the present teachings. The molded fiber material 50 preferably comprises a mixture of a kenaf fiber, which is a natural fiber obtained from kenaf bast, and a polypropylene (PP) fiber, which is a thermoplastic fiber. The lower surface shown in FIG. 7 has a relatively high concentration of PP fiber (i.e. "PP-rich"), whereas the upper surface has a relatively high concentration of kenaf fiber (i.e. "kenaf-rich").

Transitioning from the lower surface to the upper surface in FIG. 7, the concentration of PP fiber decreases and the concentration of kenaf fiber increases. Preferably, the two concentrations change gradually, continuously and seamlessly across the thickness or depth of molded fiber material 50 (i.e. the vertical direction in FIG. 7). Therefore, the molded fiber material 50 contains no interfaces, even though the concentrations of kenaf and PP vary across the thickness of the molded fiber material 50.

Herein, the term "gradually changes" indicates the concentration of at least one of the component fibers gradually changes without forming interfaces within the molded fiber material. Therefore, the term "gradually changes" distinguishes from known fiber laminates, which are formed by adhering a plurality of discrete layers, because interfaces are formed between each of the laminated layers of the known laminates.

A representative manufacturing device 10 is shown in FIG. 1 and is preferably constructed and arranged to perform a molding process S, a lamination process W and a needle punching process N. The molding process S may preferably be performed by a rotating rotary body 11, a raw material feeder 13 that feeds a raw material 12 onto the surface of the rotary body 11 and an air blower 14 that scatters the raw material 12 while the raw material 12 is being deposited on the surface of the rotary body 11. Rotary body 11 is also known in the art as a rotary drum and these two terms may be used interchangeably. A conveyor belt 15 is preferably provided to receive and transport the scattered raw material 12.

In one representative embodiment, the kenaf fiber (natural fiber) and PP fiber (thermoplastic fiber) may be mixed at a weight ratio of about 1:1, and this mixture may be used as the raw material 12. However, other weight ratios may naturally be advantageously utilized with the present teachings. The kenaf fibers are generally denser than the PP fibers. Further, the individual kenaf fibers have a rod-like shape which is limits the effect of the compressed air. On the other hand, the individual PP fibers have a wave shape and the PP fibers are generally intertwined with each other. Therefore, the PP fibers are more greatly affected by the compressed or pressurized air stream.

The raw material feeder 13 may include a hopper 13*a* for charging the raw material 12 and upper and lower conveyors 13*b*, 13*c* for feeding the raw material 12 from below the hopper 13*a*. The raw material 12 is preferably supplied to the rear portion (left side portion of FIG. 1) of the rotary body 11.

A plurality of roller pairs 11*a* is disposed between the rear and upper portions of the rotary body 11. Each roller pair 11*a* may include a large and a small roller (e.g., a walker and a stripper roller). The raw material 12 is fed onto the surface of the rotary body 11, and is then rolled and loosened by the roller pairs 11*a*-11*a*.

The air blower 14 is preferably disposed above the front surface (right side in FIG. 1) of the rotary body 11. The air blower 14 blows compressed or pressurized air toward the raw material 12 that has been loosened by roller pairs 11*a*. As a result, the raw material 12 is blown downward from the surface of the rotary body 11 toward the carrying surface of the conveyor belt 15. In addition, the raw material 12 is discharged forwardly (direction to the right in FIG. 1) due to the inertial force (centrifugal force) imparted to the raw material 12 by the rotation of the rotary body 11.

Figure 2:
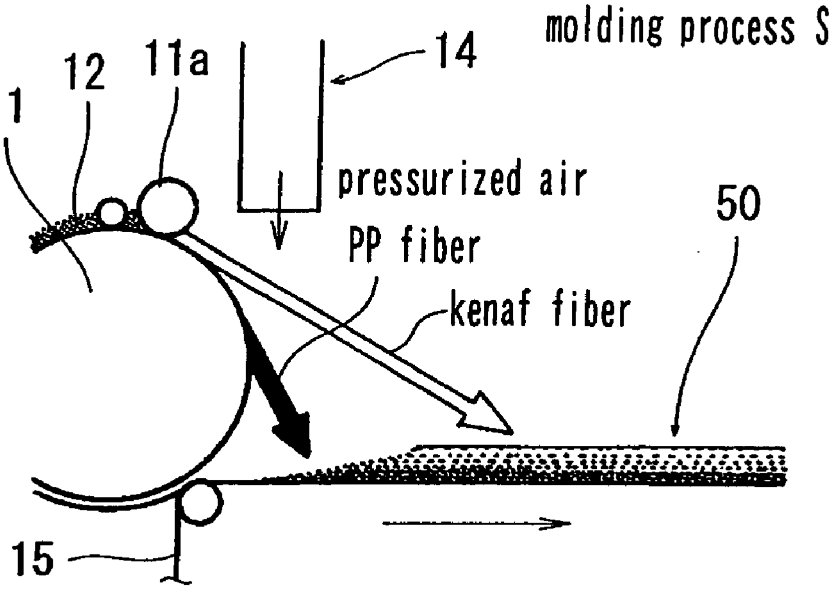
FIG. 2 shows a representative molding process S.

As shown in FIG. 2, the kenaf fiber (natural fiber) is denser than the PP fiber (thermoplastic fiber) and is not substantially affected by the high pressure air from the air blower 14. Therefore, the centrifugal force of the rotary body substantially acts on the kenaf fibers and thus scatters the kenaf fibers a relatively tangentially and a large distance from the rotary body 11, as shown by a white arrow in FIG. 2. On the other hand, because the PP fibers are less dense than the kenaf fibers, the PP fibers are less affected by the centrifugal force and more greatly influenced by the pressurized air from the air blower 14. Therefore, the PP fibers will partially separate from the kenaf fibers and fall more directly downward, as shown by a black arrow in FIG. 2. Thus, the concentration (scattering ratio) of the PP fibers will be higher close to the rotary body 11 and the concentration (scattering ratio) of the kenaf fibers will be higher farther from the rotary body 11. Consequently, the concentration of the kenaf fibers and the PP fibers can be varied across the thickness or depth of the molded fibrous material 50.

A mesh-like conveyor belt is preferably used as the conveyor belt 15. A suction device 16 may be disposed below the conveyor belt 15 and below the range in which the air blower 14 blows onto the raw material 12. Thus, the suction device 16 can ensure that the PP fibers and the kenaf fibers are effectively deposited onto the conveyor belt 15.

The conveyor belt 15 moves leftward as shown in FIG. 2. Initially, the PP fiber is deposited at a relatively high concentration within a range close to the rotary body 11. Then, as the PP fiber is transported to the right, the deposition proceeds such that the concentration of the kenaf fibers gradually increases. Therefore, a molded fiber material 50 is formed on the carrying surface so that the concentration of the two respective fibers gradually changes in the thickness or depth direction.

After a certain distance from the rotary body 11 is reached, the content of the PP fiber decreases and the kenaf fiber is deposited at a relatively high ratio. For this reason, the molded fiber material 50 is formed such that the concentration of PP fibers is higher (PP-rich) on the carrying surface (lower side) of the conveyor belt 15 and the concentration of the kenaf fiber gradually increases (kenaf-rich) towards the upper surface. The molded fiber material 50 shown in FIG. 7 has a structure in which a first side or surface is relatively PP-rich (i.e., a relatively high concentration of PP fibers as compared to kenaf fibers) and a second side or surface is relatively kenaf-rich (i.e., a relatively high concentration of kenaf fibers as compared to PP fibers).

Figure 3:
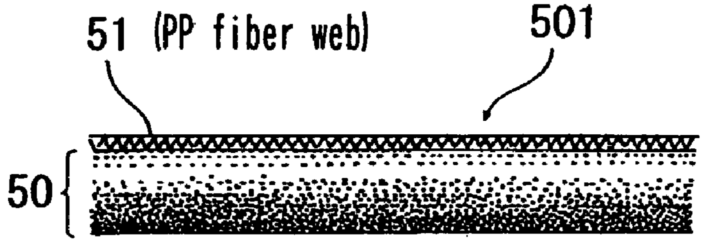
FIG. 3 shows a molded fiber material 501 in which a thermoplastic (PP) fiber web 51 is laminated onto a molded fiber material 50 during a lamination process W.

Next, a lamination process W optionally may be performed by adhering a PP fiber web 51 (thermoplastic fiber layer) containing 100% PP fiber onto the upper surface thereof (i.e., the kenaf-rich side). As a result, a molded fiber material 501 is manufactured as shown in FIG. 3. Naturally, the PP fiber web 51 may be manufactured separately from the molded fiber material 50.

Referring back to FIG. 1, a cross-layer device 17 optionally may be disposed downstream of the molding process S. The cross-layer device 17 may be used to laminate the PP fiber web 51, which is fed from a line card machine 20, onto the upper surface of the molded fiber material 50.

Figure 4:
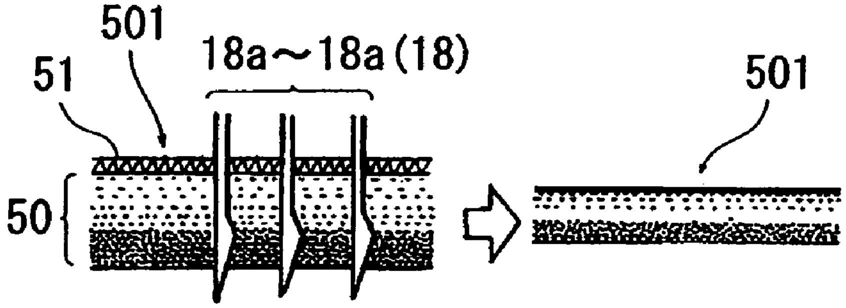
FIG. 4 shows a first representative needle punching process N.

The molded fiber material 501 may then optionally be subjected to a needle punching process N, which may be performed by an intertwining device 18 that is disposed downstream of the cross-layer device 17. The intertwining device 18 may intertwine the molded fiber material 50 with the PP fiber web 51 as shown in FIG. 4. A plurality of needles 18*a* may reciprocally move in the vertical direction in synchronism with transportation path and may pierce the laminate from the side of the PP fiber web 51, thereby intertwining the molded fiber material 501. The molded fiber material 501 intertwined during the needle punching process N may then be transported downstream and may be cut to appropriate lengths using a cutting device 19. Thereafter, the molded fiber material 501 can be, e.g., heated and pressed in subsequent processes in order to form a board.

The representative embodiments thus provide a method and an apparatus for forming molded fiber material 50 from kenaf fibers and PP fibers in a single step, thereby shortening the manufacturing process and improving production efficiency over the known art. Moreover, no interfaces are formed within the molded fiber material 50, thereby reliably preventing peeling at the interfaces and providing a more durable molded fiber material than the known art.

Figure 6:
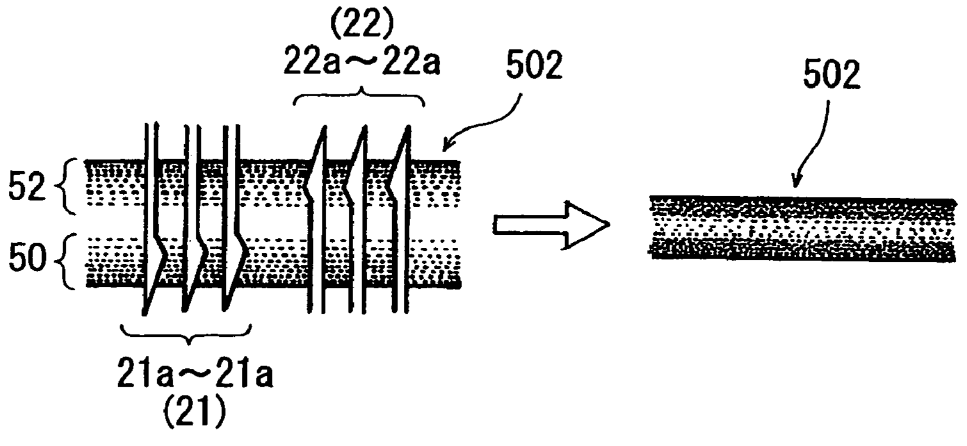
FIG. 6 shows a molded fiber laminate 502 after processing by the second representative needle punching process D.
Figure 8:
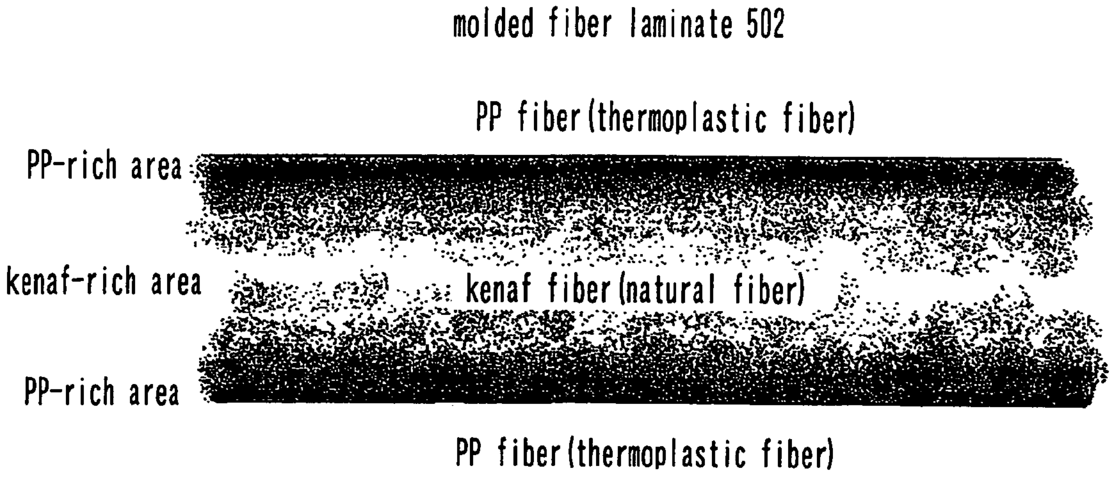
FIG. 8 shows a representative molded fiber laminate 502 that can be produced using the second representative needle punching process D.
Figure 9:
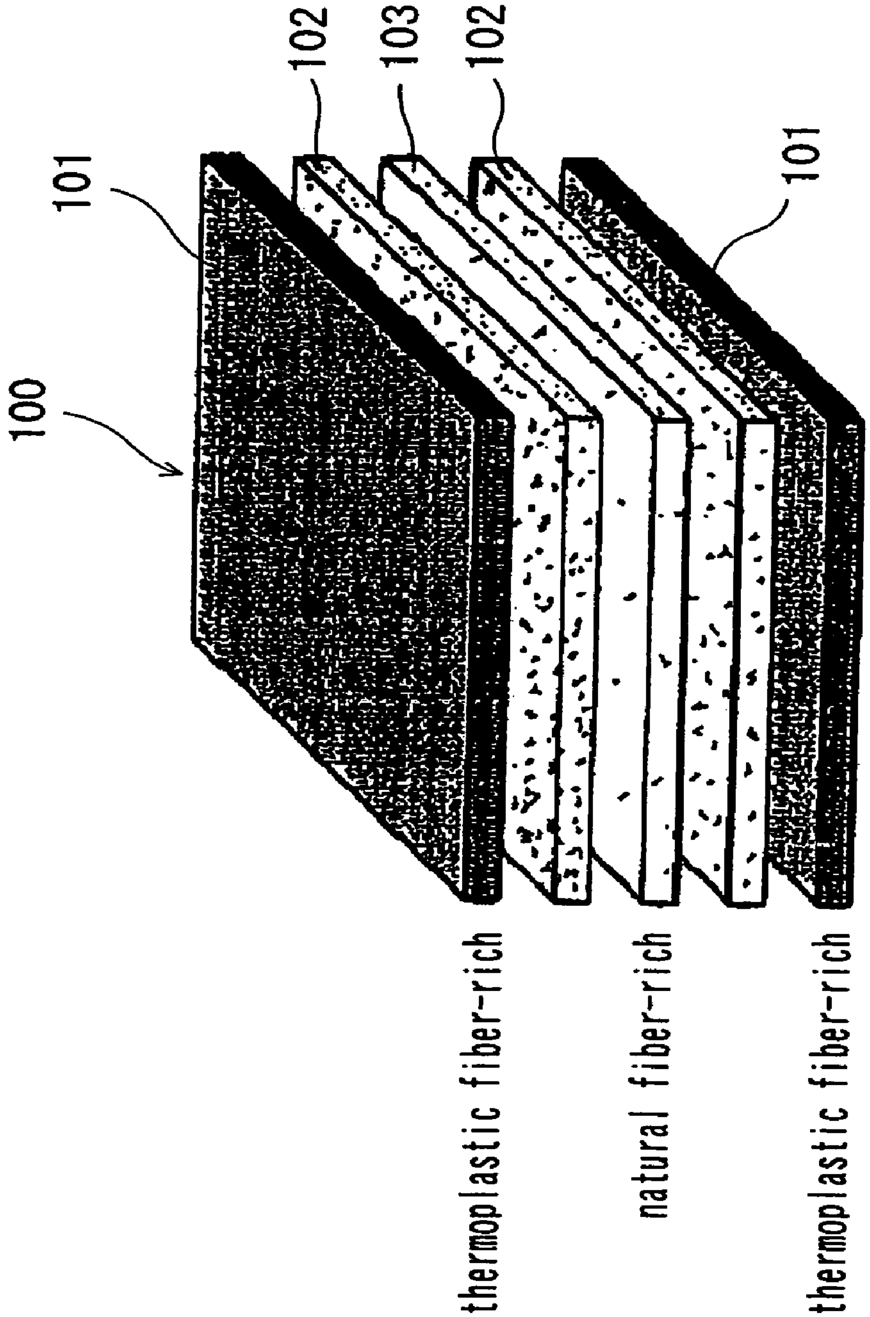
FIG. 9 PRIOR ART
FIG. 9 shows a known fiber laminate 100.

Various modifications of the representative embodiment are naturally contemplated. For example, as shown in FIG. 8, a molded fiber laminate 502 can be obtained by laminating a molded fiber material 52 with the molded fiber material 50. Of course, molded fiber material 52 may simply be molded fiber material 50, which has been inverted, or may be an entirely different composition. One representative embodiment of this technique is shown in FIG. 6, in which the molded fiber material 52 and the molded fiber material 50 are laminated or adhered so that the respective kenaf-rich sides are disposed on the interior in order to form the molded fiber laminate 502. Thus, the molded fiber laminate 502 may have a relatively high concentration of PP fibers on the exterior surfaces and a relatively high concentration kenaf fibers in the interior.

Figure 5:
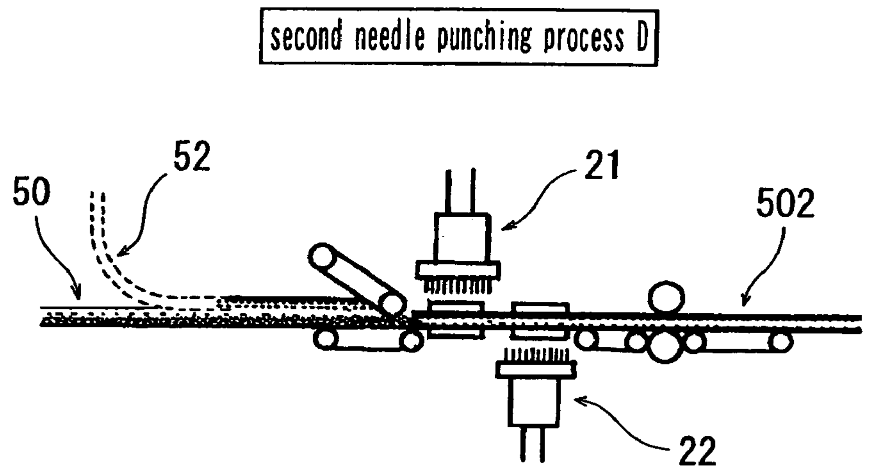
FIG. 5 shows a second representative needle punching process D.

Further, the molded fiber laminate 502 may be intertwined using a second needle punching process D, as shown in FIG. 5. Two intertwining devices 21, 22 are arranged to intertwine opposite sides of the molded fiber laminate 502. For example, the left intertwining device 21 may pierce the molded fiber laminate 502 from the upper surface (PP-rich area). Thereafter, the molded fiber laminate may be pierced by the intertwining device 22 from the lower surface (PP-rich area). As a result, the molded fiber material 50 and the molded fiber material 52 are tightly laminated or adhered and a molded fiber laminated 502 having two graded surfaces is obtained. The molded fiber laminate 502 may of course be cut to appropriate lengths in a similar manner as the above-described molded fiber material 501. Thereafter, the molded fiber laminate 502 may be heated and pressed in order to form a board.

Of course, the molded fiber laminate 502 manufactured according to the present teachings provides additional advantages. For example, it is possible to manufacture a laminate having a relatively high interior concentration of one composition and a relatively high exterior concentration of a second composition using only a single lamination or adhering step. Furthermore, because the concentration changes gradually between the interior and exterior of the molded fiber laminate 502, peeling problems are reduced and durability is increased.

The representative embodiments can be further modified by using an acetate, which can be obtained by mixing benzyl cellulose, lauroyl cellulose, or polyethylene glycol, as the thermoplastic fiber. Further, instead of kenaf fiber, other natural fibers may be advantageously utilized, such as non-woody fibers, including but not limited to as paper mulberry, Manila hemp, straw, bagasse and similar fibers, woody fibers, including but not limited to coniferous trees or broad-leaf trees, as well as mechanical pulp, chemical pulp, semi-chemical pulp, and recycled pulps thereof. Moreover, various artificial cellulose fibers can be synthesized from such pulps and such artificial cellulose fibers can be used as raw materials within the present teachings.

Further, although the raw material 12 was scattered using the rotation force of the rotary body 11 in the above-described representative embodiments, the raw material 12 also may be scattered using various other devices. For example, a structure may be used in which scattering is conducted by using a blower that blows air toward the conveyor belt 15.

The invention claimed is:

1. A method for manufacturing a molded fiber material comprising:

supplying a raw fiber material to the surface of a rotary body, the raw fiber material comprising a mixture of thermoplastic fibers and natural fibers having a density greater than the thermoplastic fibers, rotating the rotary body, thereby scattering the natural fiber and the thermoplastic fiber supplied to the rotary body toward a carrying surface due to the rotational force of the rotary body and the difference in densities between the thermoplastic fibers and the natural fibers, directing a source of pressurized air across the scattered raw materials in order to effect further separation of the thermoplastic fibers and the natural fibers, blowing pressurized air toward the carrying surface in front of the rotary body, thereby depositing the thermoplastic fibers on the carrying surface at a short distance from the rotary body and depositing the natural fibers on the carrying surface at a long distance from the rotary body, depositing the natural fibers and thermoplastic fibers on the carrying surface, such that the concentration of natural fibers and thermoplastic fibers gradualty and seamlessly changes across the thickness of the molded fiber material, and laminating two molded fiber materials together to form a molded fiber laminate, wherein the molded fiber materials are laminated such that surfaces having a greater natural fiber concentration are disposed on the interior of the molded fiber material.

2. A method according to claim 1, further comprising intertwining the natural fibers and the thermoplastic fibers.

3. A method according to claim 1, further comprising laminating a thermoplastic fiber onto the molded fiber material.

4. A method according to claim 1, wherein the thermoplastic fibers comprise polypropylene fibers and the natural fibers comprise kenaf fibers.

5. An apparatus for manufacturing a molded fiber material comprising:

a rotary body, a device for supplying and scattering a raw material across a rotating surface of the rotary body, the raw material comprising at least two fibers having different densities, the rotary body causing the at least two fibers to partially separate due to the rotational force of the rotary body, a device for blowing downward pressurized air across the scattered raw material being directed toward to the surface of the rotary body, thereby scattering and depositing the raw material and effecting further separation of the at least two fibers, the device being arranged and constructed to blow pressurized air toward the carrying surface in front of the rotary body, thereby depositing fibers having a lesser density on the carrying surface at a short distance from the rotary body and depositing the fibers having a greater density on the carrying surface at a long distance from the rotary body, a device for receiving and transporting and scattered raw material, thereby forming the molded fiber material having a lesser density fiber rich surface and a greater density fiber rich surface, and a device for laminating the two molded fiber materials such that the greater density fiber rich surfaces thereof are disposed on the interior of the molded fiber material.

6. An apparatus according to claim 5, further comprising a device adapted to needle punch the scattered raw material disposed on the transportation device.

7. An apparatus according to claim 5, wherein the thermoplastic fibers comprise polypropylene fibers and the natural fibers comprise kenaf fibers.

* * * * *